(12) United States Patent
Cross et al.

(10) Patent No.: US 7,154,481 B2
(45) Date of Patent: Dec. 26, 2006

(54) TOUCH SENSOR

(75) Inventors: Elisa M. Cross, Woodbury, MN (US);
Robert S. Moshrefzadeh, Oakdale, MN (US); Anthony F. Chernefsky, Dracut, MA (US); Frank J. Bottari, Acton, MA (US); Craig A. Cordeiro, Westford, MA (US); Stephen C. Schulz, Lee, NH (US); Michael J. Kardauskas, Billerica, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 549 days.

(21) Appl. No.: 10/183,876

(22) Filed: Jun. 25, 2002

(65) Prior Publication Data

US 2003/0234769 A1    Dec. 25, 2003

(51) Int. Cl.
*G09G 5/00* (2006.01)

(52) U.S. Cl. .................. 345/173; 345/156; 345/157; 345/174; 345/179; 178/18.01; 178/18.02; 178/18.03; 178/18.05; 178/19.01

(58) Field of Classification Search ........ 345/156–157, 345/173–174, 179; 178/18.01–18.03, 18.05–18.06, 178/19.01–19.04
See application file for complete search history.

(56) References Cited

U.S. PATENT DOCUMENTS

| 4,529,968 | A | | 7/1985 | Hilsum et al. | |
| 4,675,569 | A | * | 6/1987 | Bowman et al. | 310/328 |
| 5,149,918 | A | * | 9/1992 | Kozik et al. | 178/18.05 |
| 5,488,204 | A | * | 1/1996 | Mead et al. | 178/18.06 |
| 5,510,813 | A | * | 4/1996 | Makinwa et al. | 345/173 |
| 5,579,036 | A | * | 11/1996 | Yates, IV | 345/173 |
| 5,686,705 | A | | 11/1997 | Conroy et al. | |
| 5,729,312 | A | * | 3/1998 | Yamagishi et al. | 349/86 |
| 5,738,934 | A | * | 4/1998 | Jones | 428/220 |
| 5,790,107 | A | | 8/1998 | Kasser et al. | |
| 5,942,733 | A | * | 8/1999 | Allen et al. | 178/18.01 |
| 5,945,980 | A | | 8/1999 | Moissev et al. | |
| 5,983,727 | A | | 11/1999 | Wellman et al. | |
| 6,002,389 | A | * | 12/1999 | Kasser | 345/173 |
| 6,104,534 | A | * | 8/2000 | Ohta et al. | 359/588 |
| 6,518,091 | B1 | * | 2/2003 | Haba | 438/107 |
| 2002/0171610 | A1 | * | 11/2002 | Siwinski et al. | 345/76 |
| 2003/0054878 | A1 | * | 3/2003 | Benoy et al. | 463/29 |

FOREIGN PATENT DOCUMENTS

JP    2001-228975    8/2001

* cited by examiner

*Primary Examiner*—Richard Hjerpe
*Assistant Examiner*—Leonid Shapiro
(74) *Attorney, Agent, or Firm*—Robert J. Pechman

(57) ABSTRACT

A touch sensing method and a touch sensing device are described for sensing a location of a touch. When the touch sensing device is touched, a first conductive layer disposed on a supporting layer is deflected toward a second conductive layer. The touch location is determined by sensing the change in capacitance at the location of the touch. A change in capacitance at the touch location is sensed by driving one of the conductive layers with an electrical signal referenced to the other conductive layer and measuring the current flow between the conductive layers. The sensed change in capacitance is greater than a change in the external capacitance of the touch sensor.

4 Claims, 7 Drawing Sheets

TOUCH SENSOR

FIELD OF THE INVENTION

The present invention is directed generally to a touch sensor, and more particularly to a durable, transparent touch sensor.

BACKGROUND

Touch sensors are increasingly popular devices because they provide a natural interface between an electronic system and operator. Rather than using a keyboard to type in data, for example, touch sensors allow the user to transfer information to a computer by touching a displayed icon, or by writing or drawing on a screen. It is desirable in many applications for the touch screen to be transparent and positioned over a display.

Several types of transparent touch sensors use resistive or capacitive techniques to detect touch location. A resistive touch sensor includes two layers of transparent conductive material, such as a transparent conductive oxide, separated by a gap. When touched with sufficient force, one of the conductive layers flexes to make contact with the other conductive layer. The location of the contact point is detectable by controller circuitry that senses the change in resistance at the contact point.

Resistive touch sensors depend upon actual contact between the conductive layers, and this technique presents several problems. First, frequent contact causes the conductive layers to rub and may damage the conductive layers. Transparent conductive layers are brittle and flexing causes degradation in the conductive material due to microcracks at the flex point. With repeated flexing, an area of conductive material may flake off from one contact, thereby causing voids in the contact layers. Also, the conductive layer used in a resistive touch sensor may degrade due to interaction between the conductive layers and surrounding materials. Degradation of the conductive layers by the mechanisms discussed above may result in decreased optical transmission or loss of sensitivity, resolution, and accuracy in detecting the touch location.

A capacitive touch sensor typically includes a single conductive layer for touch detection. A finger touch to the sensor provides a capacitively coupled path from the conductive layer through the body to earth ground. The location of the contact point is detectable by controller circuitry that measures a change in a capacitively coupled electrical signal at the touch location.

In contrast to the resistive touch sensor, operation of the capacitive touch sensor described above does not require flexing a conductive layer to the point of contact. However, the capacitive sensor requires a more complex controller to compensate for low signal to noise ratio due to large external capacitance and the variability of the capacitance of the finger touch. A capacitive touch sensor requires that the touch produce a capacitively coupled circuit to ground and is only operable by a finger touch or a conductive stylus. Touches with a non-conductive stylus, gloved hand or fingernail are typically undetectable, or are undetectable under most circumstances. Further, operating a sensor by a finger touch may not provide the spatial resolution required for some applications, for example, drawing on a small hand held computer screen. Spatial resolution may be improved using a conductive stylus, however, some users find the requirement of a special stylus objectionable.

SUMMARY OF THE INVENTION

Generally, the present invention relates to a method and system for detecting the location of a touch on a touch sensor. The present invention is particularly useful when combined with a microprocessor-based system operating a display device enhanced by a transparent touch screen. More particularly, the invention is directed to a touch sensor in which the approach of a conductive layer towards another conductive layer is capacitively sensed.

In accordance with one embodiment of the present invention, a method for sensing a two-dimensional location of a touch on a touch sensor includes sensing a change in capacitance between a first transparent, conductive sheet and a second transparent, conductive sheet when at least a portion of the first transparent, conductive sheet is moved towards the second transparent, conductive sheet. The two-dimensional location of the touch is determined from signals derived from the change in capacitance between the two transparent conductive sheets.

Another embodiment of the invention is directed to a touch sensor that has a first transparent, conductive sheet supported on a flexible, transparent supporting layer. A second transparent, conductive sheet disposed to define a gap between the first and second transparent, conductive sheets. The first transparent, conductive sheet is flexible to allow local deformation towards the second transparent, conductive sheet due to a touch force without contacting the second transparent, conductive sheet so as to produce a change in capacitance between the first and second transparent, conductive sheets.

Another embodiment of the invention is directed to a touch sensor that has a first conductive layer, the first conductive layer being transparent and flexible. A second conductive layer is transparent and is disposed relative to the first conductive layer to define a gap between the first and second conductive layers. The first transparent, conductive layer is flexible to allow local deformation towards the second transparent, conductive layer due to a touch force without contacting the second transparent, conductive layer so as to produce a change in capacitance between the first and second transparent, conductive layers. A plurality of spacers is located within the gap. The spacers are transparent and permit movement of the first conductive layer towards the second conductive layer under a touch while maintaining a predetermined minimum distance between the first and second conductive layers.

Another embodiment of the invention is directed to a touch screen display system that has a touch screen for sensing a touch. The touch screen includes a first transparent, conductive sheet supported on a flexible, transparent supporting layer. A second transparent, conductive sheet is disposed relative to the first transparent, conductive layer and defines a gap therebetween. The first transparent, conductive sheet is flexible to allow local deformation towards the second transparent, conductive sheet due to a touch force without contacting the second transparent, conductive sheet so as to produce a change in capacitance between the first and second transparent, conductive sheets. A touch screen controller is coupled to the first and the second conductive sheets. The touch screen controller drives one of the first and second conductive sheets with an electrical signal referenced to the other of the first and second conductive sheets and measures capacitive current flow between the first and second conductive sheets. A display is disposed below the touch screen for displaying information.

Another embodiment of the invention is directed to a system for sensing a location of a touch on a touch sensor. The system includes means for sensing a change in capacitance between a first transparent, conductive sheet and a second transparent, conductive sheet when at least a portion of the first transparent, conductive sheet is moved towards the second transparent, conductive sheet. The system also includes means for determining the two-dimensional location of the touch from signals derived from the change in capacitance between the two transparent conductive sheets.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
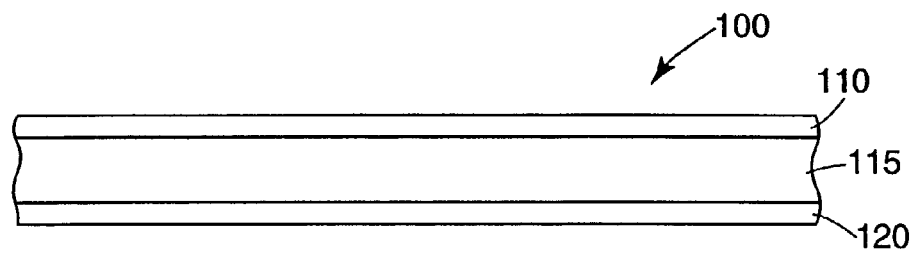
FIG. 1A schematically illustrates a cross-section of the conductive layers of a touch sensor in accordance with an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following description of the illustrated embodiments, references are made to the accompanying drawings which form a part hereof, and in which is shown by way of illustration, various embodiments by which the invention may be practiced. It is to be understood that other embodiments may be utilized, and structural and functional changes may be made without departing from the scope of the present invention.

As stated above, and for other reasons stated below which will become apparent upon reading the present specification, there is a need for a durable touch sensor that reliably and accurately detects the location of a touch independent of the touching implement used. There exists a further need for such a touch sensor with improved optical characteristics and durability. There exists a further need for a touch sensor that can be used with simplified control circuitry.

The present invention provides, among other things, a touch sensor designed to increase optical transmission through the sensor. In addition, the durability of the touch sensor is enhanced because sensor operation does not require actual contact between conductive layers, thereby reducing mechanical degradation that results from resulting from the conductive layers rubbing, sticking or flaking off, and from chemicalinteraction with other materials. Because the touch sensing device of the present invention does not depend on a capacitively coupled external path to earth ground, a simplified controller may be used incorporating an internal low impedance reference connection. The touch sensor may be employed in a variety of data processing applications, including those requiring a portable touch screen. The touch sensor of the present invention is touch instrument independent, and may be operated by touching with a finger, gloved finger, fingernail or other nonconductive object. Further, the sensor provides reliable touch sensing through moisture, dirt or other contaminants on the touch screen surface.

The touch sensor of the present invention is particularly useful when combined with various types of data processing systems. The data processing systems incorporating the touch sensor of the present invention may include a display device enhanced by a transparent touch screen, for example. Such systems may be used in kiosks, ATMs, and a variety of point of sale devices. Further, desktop, handheld or laptop computer systems may incorporate a touch sensor of the present invention. The touch sensor may also be implemented in a personal data assistant (PDA) or a cell phone. Although the touch sensing device is described in combination with a microprocessor-based system, the touch sensing device may be combined with any logic-based system, if desired. The systems and methods of the present invention may be implemented with controller circuitry that uses a capacitively coupled connection to earth ground, or with a simplified controller that uses an internal low impedance reference.

Figure 1B:
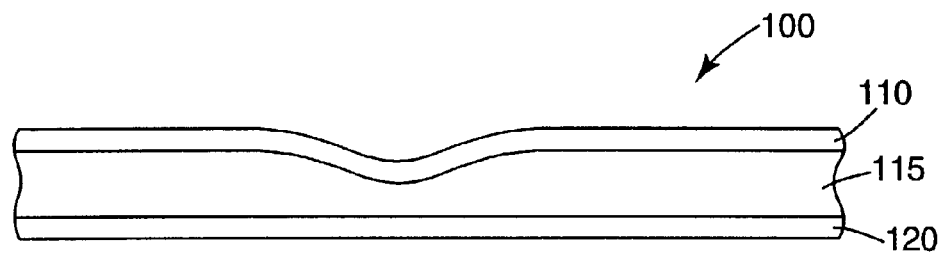
FIG. 1B schematically illustrates a cross-section of the conductive layers of a touch sensor with the top layer deflected toward the bottom layer in accordance with an embodiment of the invention.

In one embodiment, the touch sensor of the present invention includes two conductive layers disposed in a touch area and defining a gap between the two layers. A location of the touch input is determined by a change in capacitance between the two layers. The touch sensing method of the present invention includes deflecting a first conductive layer in the direction of a second conductive layer and detecting the location of the deflection. The basic operation of a touch sensor of the present invention is illustrated in FIGS. 1A and 1B. The touch sensor includes, at least, a top conductive layer 110 and a bottom conductive layer 120 separated by a gap 115. The top and bottom conductive layers 110, 120 form the capacitor plates of the capacitive touch sensor 100. Prior to a touch, the top and bottom conductive layers 110, 120 are typically positioned so that they are sufficiently separated, as shown in FIG. 1A. When touched with sufficient force, one conductive layer is locally deflected towards the other conductive layer, but is not brought into physical contact with the other layer. In the example shown in FIG. 1B, the top conductive layer 110 is deflected in the direction of the bottom conductive layer 120. The deflection of the top conductive layer causes the distance between the conductive layers 110, 120 to decrease at the location of the touch, thereby changing the capacitance between the top and bottom conductive layers 110, 120 in a local area around the point of deflection. The change in capacitance is detectable by controller circuitry coupled to the touch sensor, and can be used to determine the location of the touch.

Figure 2A:
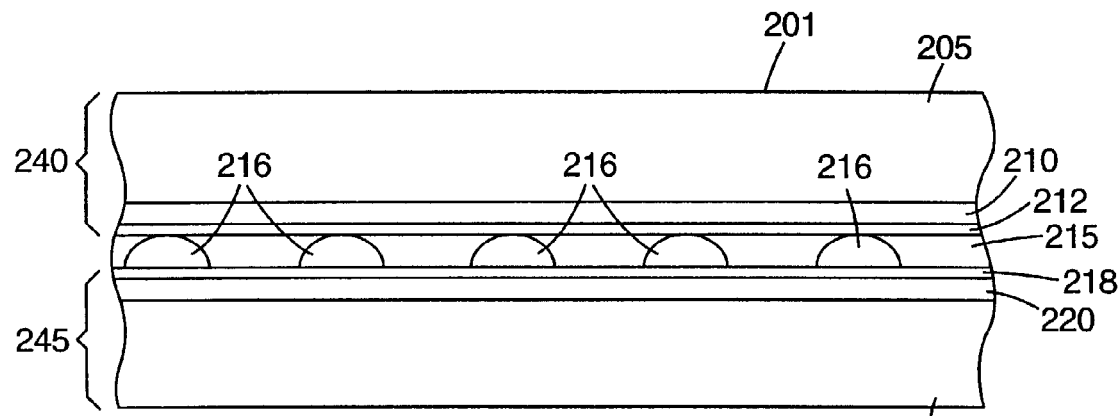
FIG. 2A schematically illustrates a cross-section of a touch sensor with two protective dielectric layers and spacers in accordance with an embodiment of the invention.

One particular embodiment of the invention is illustrated in FIG. 2A. The touch sensor 201 includes two multilayered structures 240, 245 separated by a gap 215. The top structure 240 is preferably flexible and the bottom structure layer 245 may be flexible or rigid. The top and bottom structures 240, 245 may be composed of transparent materials. Transparent touch screens are suitable for placement over a display device such as a liquid crystal display (LCD), or cathode ray tube (CRT) to create an integrated touch screen/display.

The top structure 240 includes a supporting layer 205 and a first conductive layer 210 with an optional protective coating 212. The components of the top structure 240 are preferably formed of flexible materials.

The bottom structure layer 245 may include a substrate 230 and a second conductive layer 220 that may also optionally be coated with a protective layer 218. The top and bottom structures 240, 245 are separated by a gap layer 215. Spacers 216 may be located within the gap 215 to maintain a predetermined distance between the top and bottom structures 240, 245, for example a space in the range 5 μm to 500 μm. The spacers 216 may be formed, for example, by screen printing UV curable material onto the bottom protective layer 218 or conductive layer 220 in a pattern of appropriate dimensions. Adjacent spacers may be separated from each other by a distance of between 20 μm to 5 mm.

The top supporting layer 205 may be used as an insulator for the top conductive layer 210 to reduce the effect of external capacitance on the touch sensor 201. External capacitance causes capacitive coupling between the touch sensor 201 and earth ground, and a resultant decrease in the signal to noise ratio of the touch location signal. Insulating the top conductive layer 210 with the top supporting layer 205 reduces the effect of external capacitance. The properties of the top supporting layer may be chosen to decrease capacitive coupling through the top supporting layer 205. Capacitive coupling may be decreased, for example, by using a top supporting layer 205 with appropriate material properties or thickness. In some embodiments, the dielectric thickness of the top supporting layer 205 may be formed to be greater than the dielectric thickness between the first and second conductive layers 210, 220. The dielectric thickness takes into account the actual thickness and the dielectric properties of the material over which the thickness is measured, and is proportional to the actual thickness multiplied by the relative permittivity of the material over which the thickness is measured. The dielectric thickness of the supporting layer 205 may be at least as thick as the minimum dielectric thickness between the deflected first conductive layer 210 and the second conductive layer 220. This configuration may be used to reduce external capacitive effects so that a change in capacitance induced by the deflection of the top conductive layer 210 is predominant.

The conductive layers 210, 220 are typically composed of thin sheets of conductive material. The conductive layers 210, 220 may be made as thin as possible while maintaining durability and continuity. In applications requiring a transparent touch sensor, a transparent conductive oxide such as indium tin oxide (ITO) or antimony tin oxide (ATO) may be used to form the conductors 210, 220. For example, the conductive layers 210, 220 may be comprised of ITO with a resistivity of approximately 10 to 50,000 ohms per square. In another example, the conductive layers 210, 220 may be comprised of ATO with a resistivity of approximately 10–50,000 ohms per square. The thickness of a conductive layer typically falls in the range 0.005 μm to 10 μm, although it may also have a thickness outside this range. Other transparent conductive materials may also be used for the conductive layers 210 and 220, such as an electrically conductive polymer. Suitable conductive polymers include polypyrrole, polyaniline, polyacetylene, polythiophene, polyphenylene vinylene, polyphenylene sulfide, poly p-phenylene, and polyheterocycle vinylene. An exemplary conductive polymer is is poly(3,4-ethylenedioxythiophene), a substituted polythiophene, commonly referred to as PEDOT.

The structure and operation of the capacitive touch sensor of the present invention provides enhanced durability over previous technologies. Under normal operation, the conductive layers 210, 220 are not flexed to the point of contact. Contact between the conductive layers may be prevented by coating the protective layer with a nonconductive material, or by using spacers, a filler material, or other methods to keep the conductive layers apart. This reduces the occurrence of rubbing, sticking or flaking of the conductive layers. Additionally, because no contact between conductive layers 210, 220 is required, one or both conductive layers 210, 220 can optionally be coated with a protective layer or multilayer 212, 218. The protective layer 212, 218 may be a hard coat of low surface energy material to reduce sticking, for example. The protective layers 212, 218 physically isolate the conductive layers from other sensor material, thereby mitigating degradation of the conductive layers due to chemical reaction and ion diffusion.

When the upper conductive layer 210 is pushed towards the lower conductive layer 220, the capacitive current flowing between the two conductive layers 210 and 220 is locally increased at that portion of the upper conductive layer 210 that approaches more closely towards the lower conductive layer 220. It will be appreciated that, because of this local rise in capacitive current between the two conductive layers, the touch screen may be operated with any object or stylus that depresses the upper conductive layer 210. This mode of operation contrasts with conventional capacitive touch screen that require the use of a conductive stylus.

The optional protective layers 212, 218, may also function as a transparent, antireflective coating for the conductors 210, 220. For example, the protective layers 212, 218 may be formed of $SiO_2$ and may have a thickness in the range of 0.05 μm–10 μm, although the protective layers 212, 218 may have a thickness outside this range. The bottom protective layer 218 may also be formed of $SiO_2$, and may have a thickness greater than the thickness of the protective layer 212. In addition to protecting the conductive layers, an advantage of using protective layers is that high reflective losses at the interface between the gap and the conductive layer, which typically has a high refractive index, may be reduced.

Figure 2B:
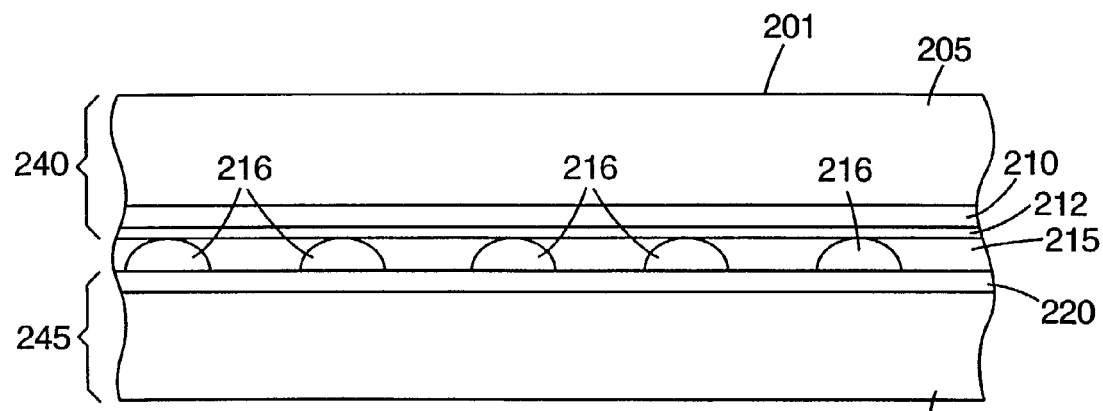
FIG. 2B schematically illustrates a cross-section of a touch sensor with one protective dielectric layer and spacers in accordance with an embodiment of the invention.
Figure 2C:
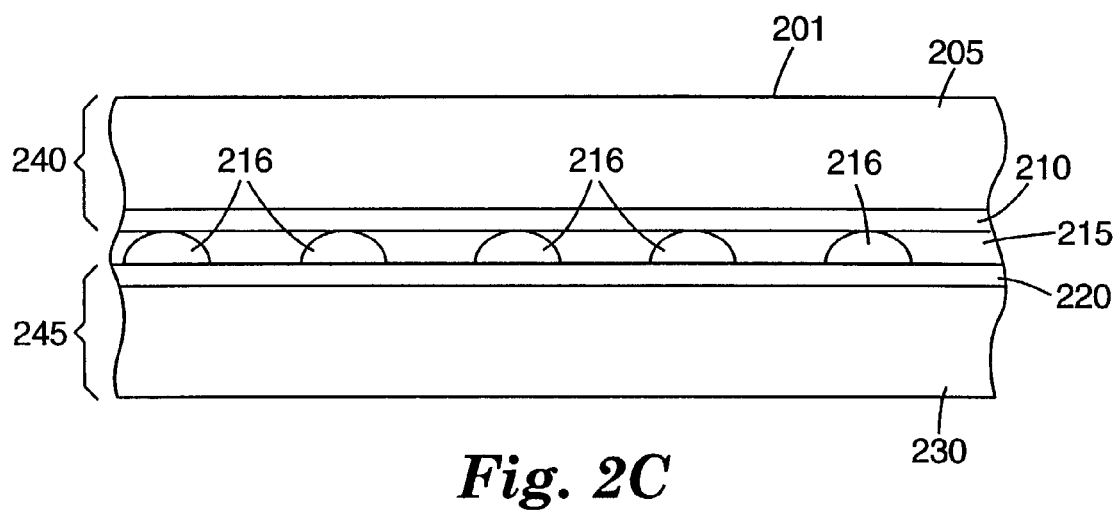
FIG. 2C schematically illustrates a cross-section of a touch sensor with spacers.

Other embodiments of the touch sensor of the present invention are schematically illustrated in FIGS. 2B and 2C. The touch sensor may be configured with only one protective layer 212 as shown in FIG. 2B, or may be configured without protective layers as illustrated in FIG. 2C. Spacers 216 may be interposed between the two conductive layers 210 and 220, with spacers designed to prevent contact between the layers, to set a uniform gap between the layers, or to provide a desired activation force.

The gap 215 may optionally be filled with a deformable material. Upon application of a touch, the gap material allows movement of one conductive layer toward the other conductive layer. When the touch is removed, the sensor layers return to their original positions. The gap material may be a liquid, or a deformable elastic material. Protective layers 212 and 218 and spacers 216 may or may not be used when a gap material is disposed between the conductive layers. The addition of gap filling material may improve display durability by dissipating the energy applied during a touch, making the sensor more resistant to damage.

Where transparency through the sensor is important, the gap filler material may be a deformable material with appropriate optical properties to increase overall transmission through the sensor. The gap filler material preferably deforms without the creation of air pockets that cause the material to become optically lossy. For example, the gap filler material may be polyurethane epoxy, silicone, a rubbery material, or a gel. Furthermore, the gap filler material may have a refractive index similar to that of the surrounding materials, so as to reduce reflective losses at the material interfaces.

In addition, the gap filler may be composed of a material that changes dielectric properties when compressed, further enhancing the change in capacitance induced by a touch. One type of material that changes electrical properties under pressure is a deformable material that is loaded with conductive particles. The conductive particles may be particles of metal, metal oxide, or a conductive polymer. In addition, the particles may be coated with a conductive material, for example, a metal, a metal oxide, or conductive polymer. The refractive index of the particles may be selected to increase optical transmission through the sensor. For example, the scattering and reflection losses due to the particles in a matrix are reduced when the difference in the refractive index between the particles and the matrix is reduced.

The gap filler may also be composed of a material that exhibits a change in electrical properties with pressure, such as a piezoelectric material. A configuration incorporating pressure sensitive materials as the gap filler material may provide a signal indicating the force as well as the location of the touch, e.g. giving z-axis sensitivity. A piezoelectric gap filler material may be used as a force transducer, wherein a force applied to the surface of the sensor causes a corresponding change in the voltage across the gap. The magnitude of the touch force may be determined by measuring the voltage across the piezoelectric material. Suitable piezoelectric materials include poled polyvinylidene fluoride (PDVF) and ferroelectric liquid crystal.

Figure 3A:
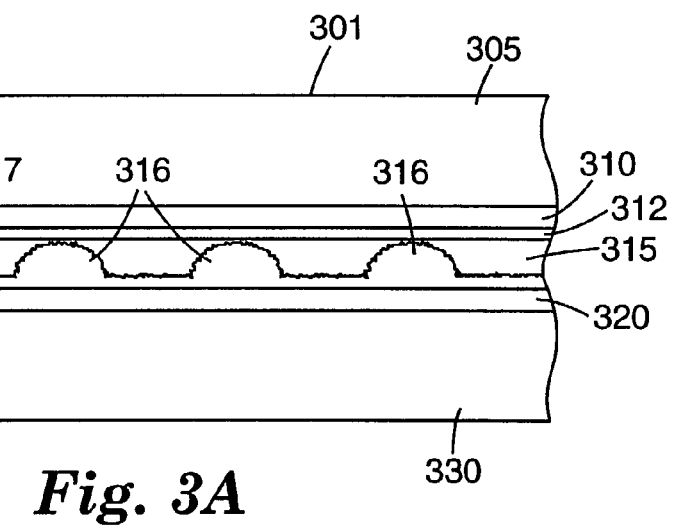
FIG. 3A schematically illustrates a cross-section of a touch sensor with a top protective layer, a bottom protective layer with integrated spacers and anti-Newton's rings textures in accordance with an embodiment of the invention.

Another embodiment of the invention, illustrated in FIG. 3A, includes a top structure 340 with a supporting layer 305, a first conductive layer 310, and an optional protective layer 312 as previously discussed. In this embodiment, the bottom structure 345 includes an optional substrate 330, a bottom conductive layer 320 and a protective layer 318 provided with integrated spacers 316. Alternatively, the top protective layer 312 may include the integrated spacers 316. The protective layer 318 integrated with the spacers 316 can be formed, for example, by standard microreplication methods using a UV curable material such as an acrylate or methacrylate composition. The spacers may vary in density and dimensions to alter the physical stiffness of the sensor to control the touch activation force. For example, the spacers may have a diameter between 5 μm and 250 μm, a height between 2 μm and 50 μm and be spaced apart by 0.5 mm to 5 mm, although they may have dimensions outside these ranges. The material used to form the protective layer 318 integrated with the spacers 316 may be loaded with silica or other particles, with dimensions in the range of 10 nm to 10 μm to increase hardness, if desired.

Optionally, a roughened surface 317 may be superimposed on the spacers 316 and protective layer 318 to reduce the occurrence of glare and Newton's rings when the top structure 340 is brought into contact with the bottom structure 345. The roughened surface of the spacers 316 and protective layer 318 reduces the visibility of the spacers 316 and the layer 318 in a transparent sensor, allowing larger spacers to be used for control of touch activation force, if desired. In addition, the index of refraction of the top and bottom layers 340, 345 may be adjusted to increase optical transmission through the sensor. As discussed previously, the gap 315 between the top and bottom layers 340, 345 may optionally be filled with a deformable, elastic material.

Figure 3B:
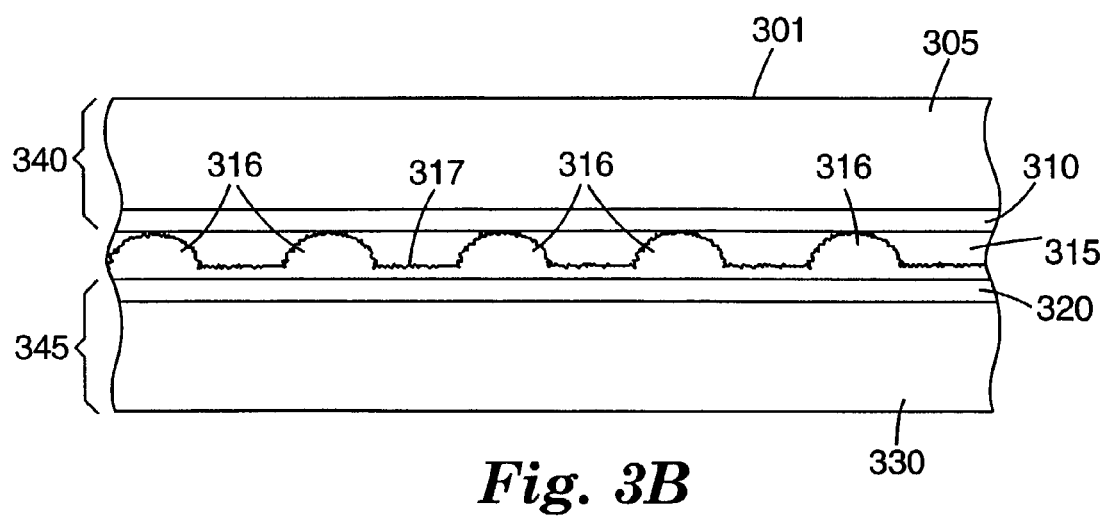
FIG. 3B schematically illustrates a cross-section of a touch sensor with a bottom protective layer with integrated spacers and anti-Newton's rings textures in accordance with an embodiment of the invention.

In another embodiment of the invention, shown schematically in FIG. 3B, the top protective layer is not present. The bottom protective layer 318 includes integrated spacers 316.

Another approach for maintaining the distance between the top and bottom layers, described with reference to FIGS. 4A–4D, is to fill the gap with a material having appropriate mechanical properties to maintain the separation between the top and bottom layers. Typically, this material is compressible so that the upper structure may approach the lower structure under the application of a touch, and is also resilient, so that the upper structure rebounds to its equilibrium position once the touch is removed. In some embodiments, the material is not expelled from the region of the touch, and so the conductive layers do not come into contact with each other. The gap filler material may also be loaded with particles, for example, glass particles that act as spacers to maintain a minimum separation between the conductive layers 410, 420.

Figure 4A:
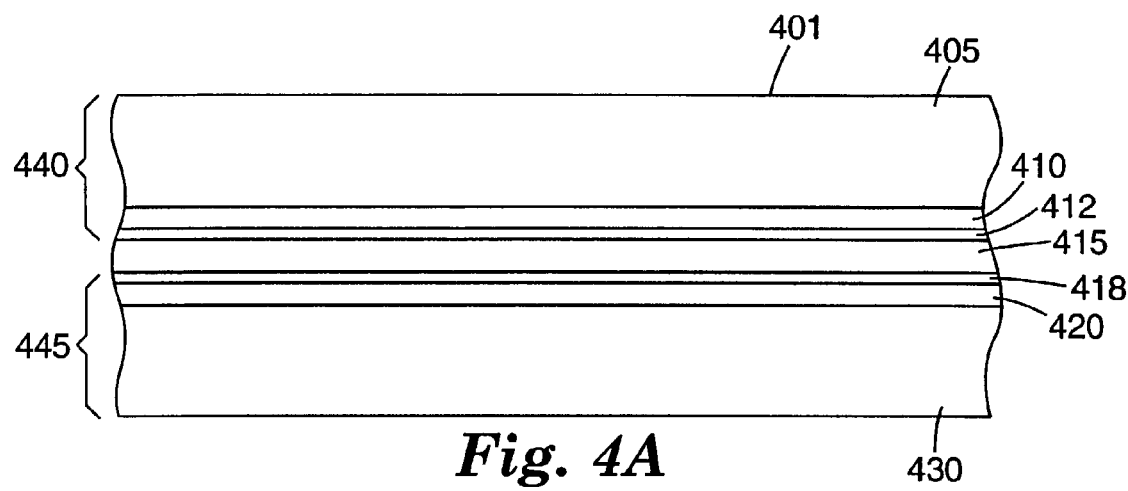
FIG. 4A schematically illustrates a cross-section of a touch sensor with a top and a bottom protective layer in accordance with an embodiment of the invention.

In the embodiment of a touch sensor shown in FIG. 4A, a flexible top structure 440 includes a supporting layer 405, first conductive layer 410 and may also include a protective layer 412. The layers 405, 410 and 412 forming the top structure 440 are typically composed of flexible materials so as to permit the structure 440 to flex under an applied force. A bottom structure 445 includes an optional substrate 430, a second conductive layer 420 and may also include a protective layer 418. The bottom structure 445 may be flexible or rigid. The top and bottom structures 440, 445 are separated by a gap 415 that is filled with a gap filling material.

Figure 4B:
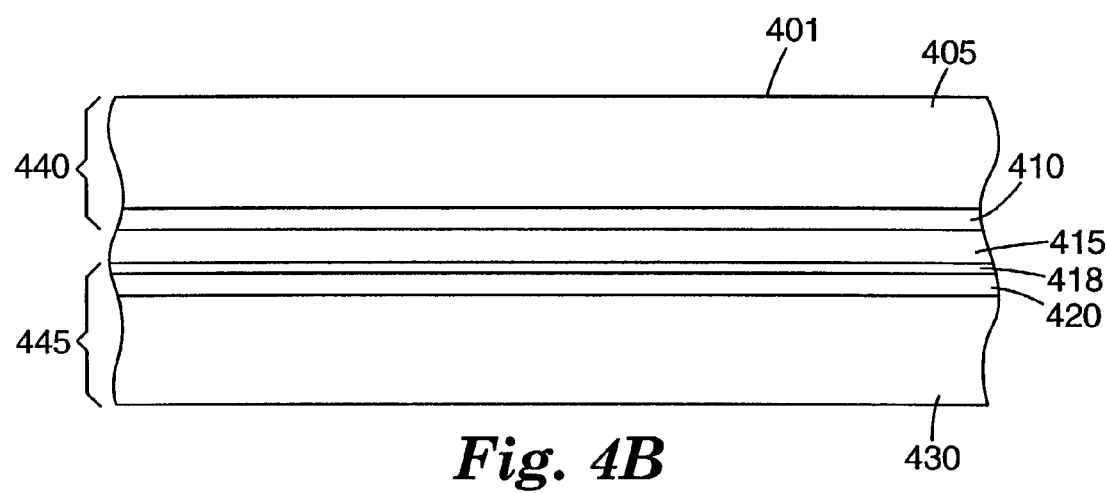
FIG. 4B schematically illustrates a cross-section of a touch sensor with a one protective layer in accordance with an embodiment of the invention.
Figure 4C:
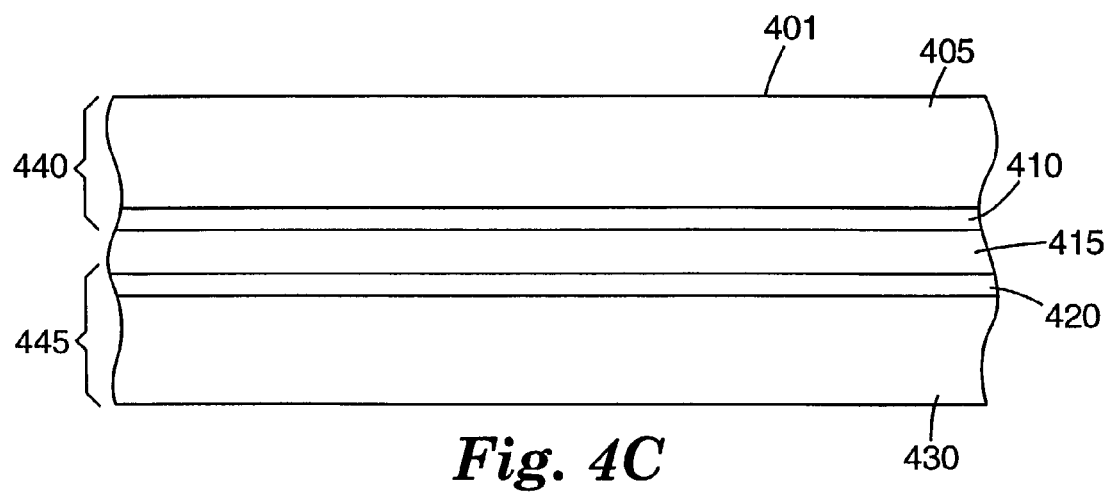
FIG. 4C schematically illustrates a cross-section of a touch sensor in accordance with an embodiment of the invention.

FIGS. 4B and 4C schematically illustrate other embodiments of the invention in which a gap filler material is used to separate the conductive layers. The touch sensor may be configured with only one protective layer 418 disposed on the bottom conductive layer 420 as shown in FIG. 4B. Alternately, the protective layer may be disposed over the top conductor 410. Where one or more protective layers 412 and 418 are used, the protective layer or layers may be relied on to prevent contact between the conductive layers 410 and 420, and so the gap filler material may be expended from the location of the touch.

Furthermore, the touch sensor may be configured without protective layers, for example as schematically illustrated in FIG. 4B. In such a case, the gap filler material is designed to prevent contact between the conductive layers 410 and 420 and is, therefore, not expended from between the conductive layers 410 and 420 at the location of the touch.

Figure 4D:
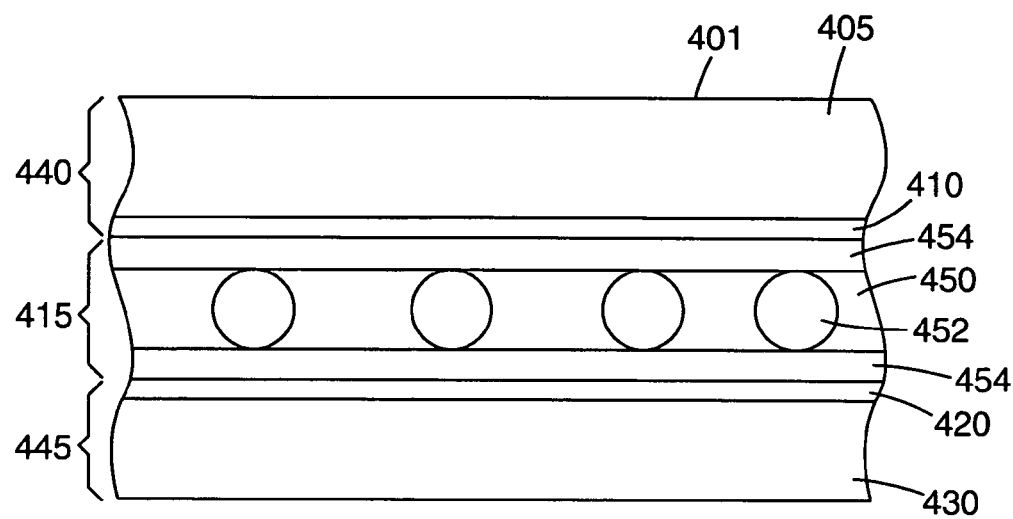
FIG. 4D schematically illustrates a cross-section of a touch sensor in accordance with an embodiment of the invention.

Another embodiment is schematically illustrated in FIG. 4D. In this embodiment, the gap 415 includes a layer 450 that is embedded with particles 452, for example glass particles, that are relatively hard to compress. The particles 452 may have a size equal to the thickness of the layer 450 (as shown), or may be smaller than the thickness of the layer 450. There is at least one compressible layer 454, for example formed from an elastomer, between the layer 450 and one of the conductive layers 410 and 420. In the particular embodiment illustrated, there is a compressible layer 454 between the layer 450 and each of the conductive layers 410 and 420. When the user touches this touch screen, the compressible layer 454 or layers compress under the force of the touch, allowing the upper conductive layer 410 to approach the lower conductive layer 420, thus altering the capacitance between the two layers 410 and 420.

Figure 5:
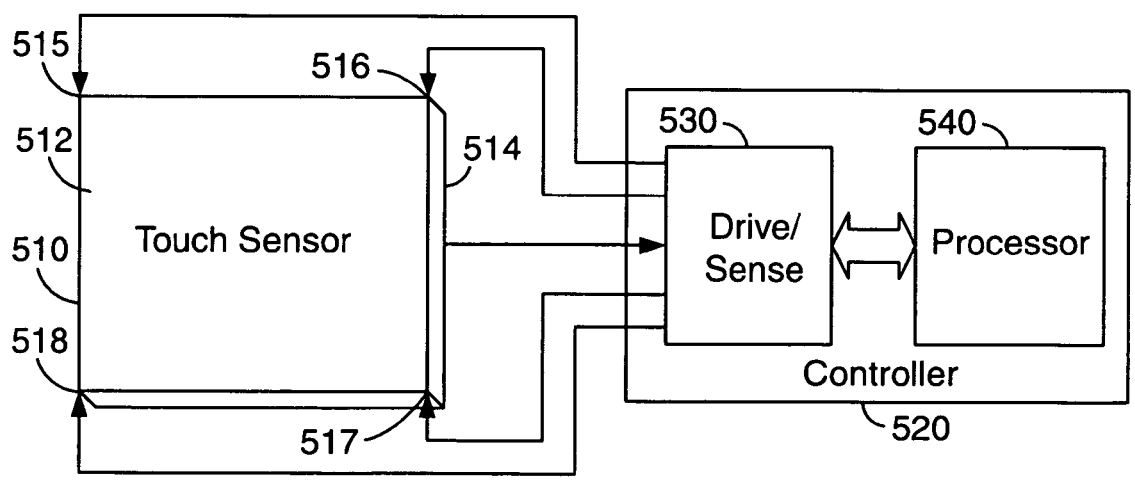
FIG. 5 is a block diagram illustrating a touch sensor and 5-wire controller in accordance with an embodiment of the present invention.

One approach used to detect a two dimensional touch location on a touch sensor according to an exemplary embodiment of the invention is a 5-wire technique. FIG. 5 illustrates a block diagram of a 5-wire touch sensing system for detecting the location of a touch on a touch sensor. The system includes a two dimensional (x,y) touch sensor 510 and a controller 520. The touch sensor 510 is based on a closed detection circuit that permits the sensor to be used in a handheld device, such as a personal digital assistant, mobile telephone, or the like. Furthermore, the signal to noise ratio of the sensor 510 is higher than is typically obtained with other capacitive-based touch sensors.

Drive circuitry 530 in the controller 520 injects an alternating electrical signal through contacts 515, 516, 517, 518 located at four different positions on one of the conductive layers of the touch sensor, for example, the top layer 512. In one configuration, the top layer 512 is rectangular in shape and the contacts 515, 516, 517 and 518 may be located at the four corners of the top layer 512. The remaining conductive layer, in this case the bottom layer 514, provides the return path and reference layer for the injected signal. Although the touch sensor is shown in FIG. 5 as rectangular in shape, the touch sensor need not be rectangular and may have any shape.

The use of the bottom layer 514 as the reference layer advantageously provides shielding for the touch sensor from electromagnetic interference (EMI) originating in a display, such as an LCD or CRT display (not shown), located below the touch screen. This may eliminate the need for an additional conductive layer, usually found in present capacitive touch screens, to act as an EMI shield between the display and the touch sensor. An optional pattern of conductive segments (not shown) disposed on the surface of the conductive layer and coupled to the contacts 515, 516, 517, 518 may be used to linearize the electric field across the surface of the top conductive layer.

Before application of a touch, the drive circuitry generates current flow at each contact 515, 516, 517, 518 through the touch sensor. A touch causes a change in the current from each contact 515, 516, 517, 518 through the touch sensor in proportion to the distance of the touch from the contact 515, 516, 517, 518. The sense circuitry 530 measures the current at each of the four contacts 515, 516, 517, 518. The currents measured at each of the four contacts 515, 516, 517, 518 of the touch sensor vary as a function of the touch location. In this embodiment, the location of a touch is determined in the processor 540 by comparing the currents measured at the contacts 515, 516, 517, 518 of the top layer 512. In another embodiment, the electrical signal is injected and current measured at contacts located at four positions of the bottom layer 514 and the top layer 512 serves as a return path reference layer. Although, in the above example, the electrical signal is injected and current is measured at contacts located at four positions on the touch sensor, any number of contacts may be used.

Figure 6:
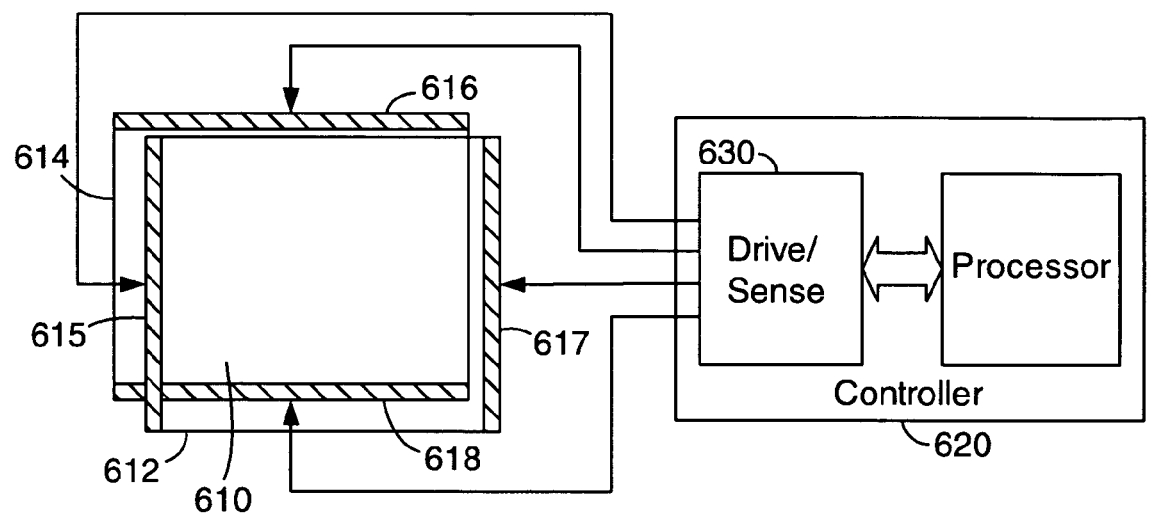
FIG. 6 is a block diagram illustrating a touch sensor and 4-wire controller in accordance with an embodiment of the present invention.

Another approach used to detect touch location on a touch sensor according to an embodiment of the invention is a 4-wire technique. FIG. 6 illustrates a block diagram of a 4-wire system for detecting the location of a touch on a sensor. The system includes a two dimensional (x,y) touch sensor 610 and a controller 620.

In this configuration, the touch sensor has two sets of contacts. Vertical contacts 615, 617 are located on the top conductive layer 612. Horizontal contacts 616, 618 are located on the bottom conductive layer 614. The 4-wire system operates by separately determining the x and y coordinates of the touch location.

For example, the x coordinate of the touch may be determined by energizing the top conductive layer 612 through the vertical contacts 615, 617 of the touch sensor 610 coupled to the drive/sense circuitry 630. The bottom conductive layer serves as the reference coupled through the horizontal contacts 616, 618 to the controller 620. The sense circuitry 630 measures the capacitive current flow at each of the vertical contacts 615, 617. The capacitive current measured at the vertical contacts 615, 617 of the touch sensor 610 varies as a function of the x location of the touch location. The relative amounts of capacitive current flowing through the vertical contacts 615, 617 indicate the x coordinate of a touch.

The y coordinate of the touch location may be determined by energizing the bottom conductive layer 614 through the horizontal contacts 616, 618 coupled to the drive/sense circuitry 630. The top conductive layer serves as the reference coupled to the controller through the vertical contacts 615, 617. The sense circuitry 630 measures the capacitive current flow at each of the horizontal contacts 616, 618. The capacitive currents measured at each of the horizontal contacts 616, 618 varies as a function of the y location of the touch. The relative amounts of capacitive current flowing trough the horizontal contacts 616, 618 indicate the y coordinate of a touch.

Figure 7:
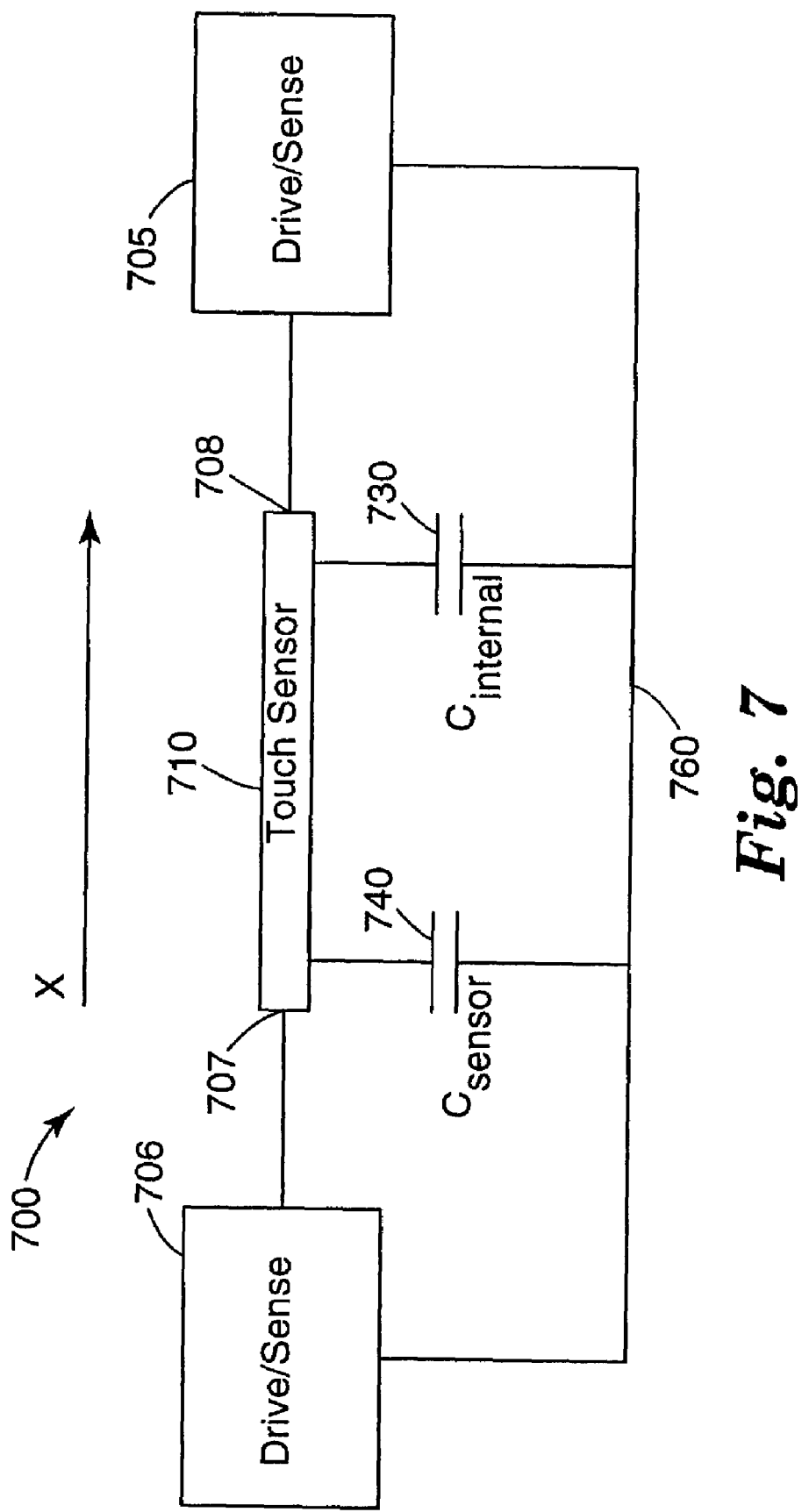
FIG. 7 schematically illustrates a touch sensor used with a simplified controller in accordance with an embodiment of the invention.

FIG. 7 schematically illustrates the configuration of drive/sense circuitry and the touch sensor of the present invention used with simplified controller circuitry according to one embodiment. In this embodiment, the drive/sense circuitry 705, 706 is connected to two contacts 707, 708 located at opposite ends of a one dimensional touch sensor 710 for injecting an electrical signal and measuring the current. The touch sensing system 700 shown in FIG. 7 is capable of detecting the x coordinate of the touch location. The sensing system is shown as a one dimensional system for simplicity, although it will be appreciated that the principles for one dimensional sensing may be extended to two dimensional sensing with the addition of at least one contact and associated circuitry. Furthermore, it should be appreciated that the circuit illustrated in FIG. 7 is presented as only an example and that other configurations of closed-loop detection circuit may be used.

The drive/sense circuitry 705, 706 of the sensing system 700 is connected to contacts 707, 708 at each end of the touch sensor 710 for injecting an electrical signal and measuring the resultant current. A processor (not shown) uses the ratio of current values measured at the contacts 707, 708 of the touch sensor 710 to determine a touch location. In the configuration of FIG. 7, the capacitive coupling of the touch sensor to earth ground is reduced and the system uses only a known low impedance connection 760 as a reference connection. Important features of this arrangement include the internally closed circuit of the detection system, which contrasts with other capacitive sensor circuits where the detection circuit is closed by the user. As a result of the internally closed circuit, the parameters of the detection circuit are known and are relatively stable with time. On the other hand, in other capacitive detection circuits, the coupling capacitance to earth ground may change between different times of use.

$C_{sensor}$ 740 is a variable capacitance that changes upon application of a touch. Prior to a touch, $C_{sensor}$ 740 has a fixed value primarily dependent on sensor parameters, including the distance between the conductive layers and dielectric constants of the gap filler material and protective layers, if any. Upon application of a touch, the sensor parameters change as the distance between the conductive layers decreases, causing a corresponding change in the value of $C_{sensor}$ 740. The change in the ratio of touch sensor current at the contacts 707, 708 of the touch sensor due to a change in $C_{sensor}$ 740 may be detected by a processor (not shown) and converted into touch location.

The low impedance reference connection 760 depicted in FIG. 7 significantly decreases the effect of external capacitive coupling of the sensor to ground. The reduction of external capacitive coupling reduces the need to track and compensate for the effects of external capacitance, allowing a simplified controller circuitry to be used. External capacitance is additionally reduced by using a supporting layer with appropriate thickness and material properties to insulate the first conductive layer of the sensor from the environment. Therefore, stray capacitance, which is represented by $C_{internal}$ 730, is fixed. The reduction in the dependence on the external capacitance and the fixed stray capacitance both result from the use of an internally closed circuit in the touch detection system.

The discussion presented in connection with FIG. 7 describes touch sensing using a one dimensional touch sensor to facilitate illustration. The two dimensional coordinates of the touch location may be determined with the addition of one or more electrodes and associated circuitry. In a two dimensional configuration, the previously described 5-wire or 4-wire techniques may be used to detect the touch location.

The simplified controller illustrated in FIG. 7 uses a low impedance reference connection, thereby reducing the effect of external capacitance on the system. The touch sensing system of present invention can be implemented with a simplified controller because external capacitive coupling of the sensor is reduced through the use of an internal low impedance reference connection and an insulating layer over the conducting layer. The use of a low impedance reference has advantages in addition to those previously discussed. First, because the touch sensor does not rely on a connection through earth ground, the sensor is touch instrument independent and may be used with a conductive or nonconductive stylus, a gloved hand, or any implement that pushes one conductive layer towards the other. Second, because of the internally closed circuit, the stray capacitance is reduced and fixed. Third, because the circuitry does not depend upon an earth ground connection, the touch sensor may be used for various portable applications, such as PDAs, and cell phones. Fourth, only two conductive layers are used for two-dimensional position sensing, which is important because conductive layers typically have high values of refractive index compared to the surrounding layers, which introduces optical losses. The use of only two conductive layers with a closed-circuit detection system maintains low optical losses while maintaining device portability.

Figure 8:
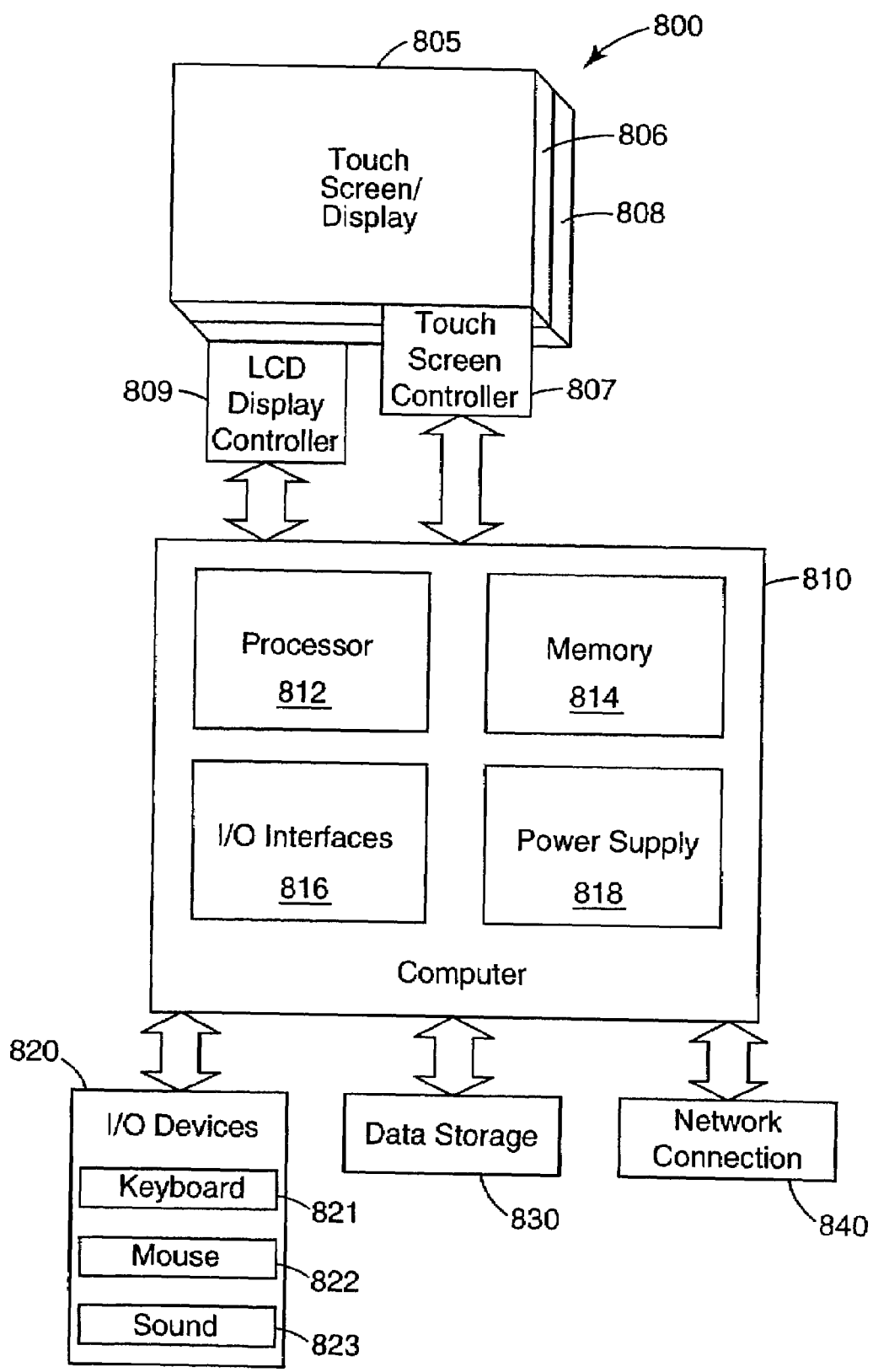
FIG. 8 is a block diagram of a data processing system using a touch sensing interface in accordance with an embodiment of the invention.

Turning now to FIG. 8, a block diagram of a data processing system 800 using an integrated touch screen and display is shown in accordance with an embodiment of the present invention. The system 800 uses a transparent touch screen 806 arranged above a display 808 suitable for data processing applications, such as an LCD display. Other displays may be used, such as a CRT display, plasma display, LED display or the like. The display 808 may require display controller circuitry 809 for interfacing the display with the data processor 810. The touch screen controller 807 includes the drive/sense circuitry described above in addition to a touch screen processor according to an embodiment of the present invention.

The data processor 810 may include various components depending upon the computer system application. For example, the data processor may include a microprocessor 812, various types of memory circuitry 814, a power supply 818 and one or more input/output interfaces 816. The input/output interfaces 816 allow the data processing system to connect to any number of peripheral I/O devices such as keyboards 821, pointing devices 822, and sound devices 823, including microphone and speakers. The data processing system may additionally include a mass data storage device 830, for example, a hard disk drive or CD ROM, and may be networked to other data processing systems through a physical or wireless network connection 840.

A touch sensing method and system in accordance with the principles of the present invention provides several advantages. For example, the touch sensor is coupled through a low impedance reference connection instead of the tenuous connection to earth ground used for conventional capacitive touch sensors. Further, the touch sensor structure described herein reduces and stabilizes the effect of external capacitive coupling to earth ground. Reduction of tracking and compensation circuitry for external capacitive effects allows the touch sensor to operate with a simplified controller. Finally, the touch sensing method and system of the present invention allows detection of either a finger touch, gloved hand, fingernail, conductive or nonconductive stylus. The touch sensing approach described herein is well-suited for use with various data processing systems, including personal data assistants (PDAs), electronic instruments, cell phones, and computers, including handheld, laptop and desktop computers. The touch sensor can provide enhanced optical transmission and improved durability because it does not require actual contact between conductive layers.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A touch sensor, comprising:
   a first conductive layer, the first conductive layer being transparent, electrically continuous over a touch area, and flexible;
   a second conductive layer, the second conductive layer being transparent, electrically continuous over the touch area and disposed relative to the first conductive layer to define a gap between the first and second conductive layers, the first transparent, conductive layer being flexible to allow local deformation towards the second transparent, conductive layer due to a touch force without contacting the second transparent, conductive layer so as to produce a change in capacitance between the first and second transparent, conductive layers, the change in capacitance being used to determine the two-dimensional location of the touch force; and
   a plurality of spacers located within the gap, the plurality of spacers being transparent and permitting movement of the first conductive layer towards the second conductive layer under a touch while maintaining a predetermined minimum distance between the first and second conductive layers, wherein at least one of the first and second conductive layers includes a protective coating and wherein the plurality of spacers is formed integrally with the protective coating.

2. The touch sensor of claim 1, wherein a surface of the protective coating with integrated spacers is roughened so as to reduce glare and occurrence of Newton's rings.

3. A touch sensor, comprising:
   a first conductive layer, the first conductive layer being transparent, electrically continuous over a touch area, and flexible;
   a second conductive layer, the second conductive layer being transparent, electrically continuous over the touch area and disposed relative to the first conductive layer to define a gap between the first and second conductive layers, the first transparent, conductive layer being flexible to allow local deformation towards the second transparent, conductive layer due to a touch force without contacting the second transparent, conductive layer so as to produce a change in capacitance between the first and second transparent, conductive layers, the change in capacitance being used to determine the two-dimensional location of the touch force; and
   a plurality of spacers formed of a particle loaded material and located within the gap, the plurality of spacers being transparent and permitting movement of the first conductive layer towards the second conductive layer under a touch while maintaining a predetermined minimum distance between the first and second conductive layers.

4. The touch sensor of claim 3, wherein the spacers are formed of a material loaded with silica particles.

* * * * *